United States Patent
Wada et al.

(10) Patent No.: US 6,213,069 B1
(45) Date of Patent: Apr. 10, 2001

(54) VALVE TIMING CONTROL DEVICE FOR USE IN AN INTERNAL COMBUSTION ENGINE

(75) Inventors: Koji Wada; Atsuko Hashimoto, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/531,219

(22) Filed: Mar. 20, 2000

(30) Foreign Application Priority Data

Sep. 13, 1999 (JP) .................................. 11-258764

(51) Int. Cl.[7] ................ F02D 13/02; F01L 1/34
(52) U.S. Cl. ...................... 123/90.15; 123/90.17
(58) Field of Search ............... 123/90.15, 90.16, 123/90.17, 90.18, 90.31

(56) References Cited

U.S. PATENT DOCUMENTS 5,628,286 * 5/1997 Kato et al. ..................... 123/90.15
6,006,707 * 12/1999 Ito ................................. 123/90.15
6,079,381 * 6/2000 Morikawa ...................... 123/90.15

FOREIGN PATENT DOCUMENTS 10-318002  12/1998  (JP) .

* cited by examiner

Primary Examiner—Weilun Lo
(74) Attorney, Agent, or Firm—Sughrue, Mion, Zinn, Macpeak & Seas, PLLC (57) ABSTRACT

A valve timing control device for use in an internal combustion engine includes a valve timing controller for variably controlling the open/close timing of intake and exhaust valves of the internal combustion engine, a drive force estimator provided in the valve timing controller for estimating a drive force of a VVT actuator on the basis of a hydraulic pressure supplied thereto, and a variable control limiter for limiting control made by the valve timing controller when the drive force of the VVT actuator, which is estimated by the drive force estimator, is equal to or less than a variable valve timing control limit boundary value.

6 Claims, 7 Drawing Sheets

FL : VTT CONTROL LIMIT BOUNDARY VALUE

FI : MINIMUM ACT DRIVE FORCE THAT SATISFIES RESPONSE TIME REQUIRED WHEN VVT IS IN OPERATING STATE

FL < ACT DRIVE FORCE ≦ FL + FLN : VICINITY OF VVT CONTROL LIMIT BOUNDARY VALUE

VALVE TIMING CONTROL DEVICE FOR USE IN AN INTERNAL COMBUSTION ENGINE

BACKGROUND OF THE INVENTION

1. Field of the Invention

The present invention relates to an internal combustion engine having a variable valve timing mechanism (hereinafter simply referred to as VVT) that variably controls the open/close timing (hereinafter simply referred to as valve timing) of an intake valve and an exhaust valve of the internal combustion engine in response to the operating state of an engine, and more particularly to a valve timing control device for controlling the operation of the VVT in its abnormal state.

2. Description of the Related Art

Figure 9:
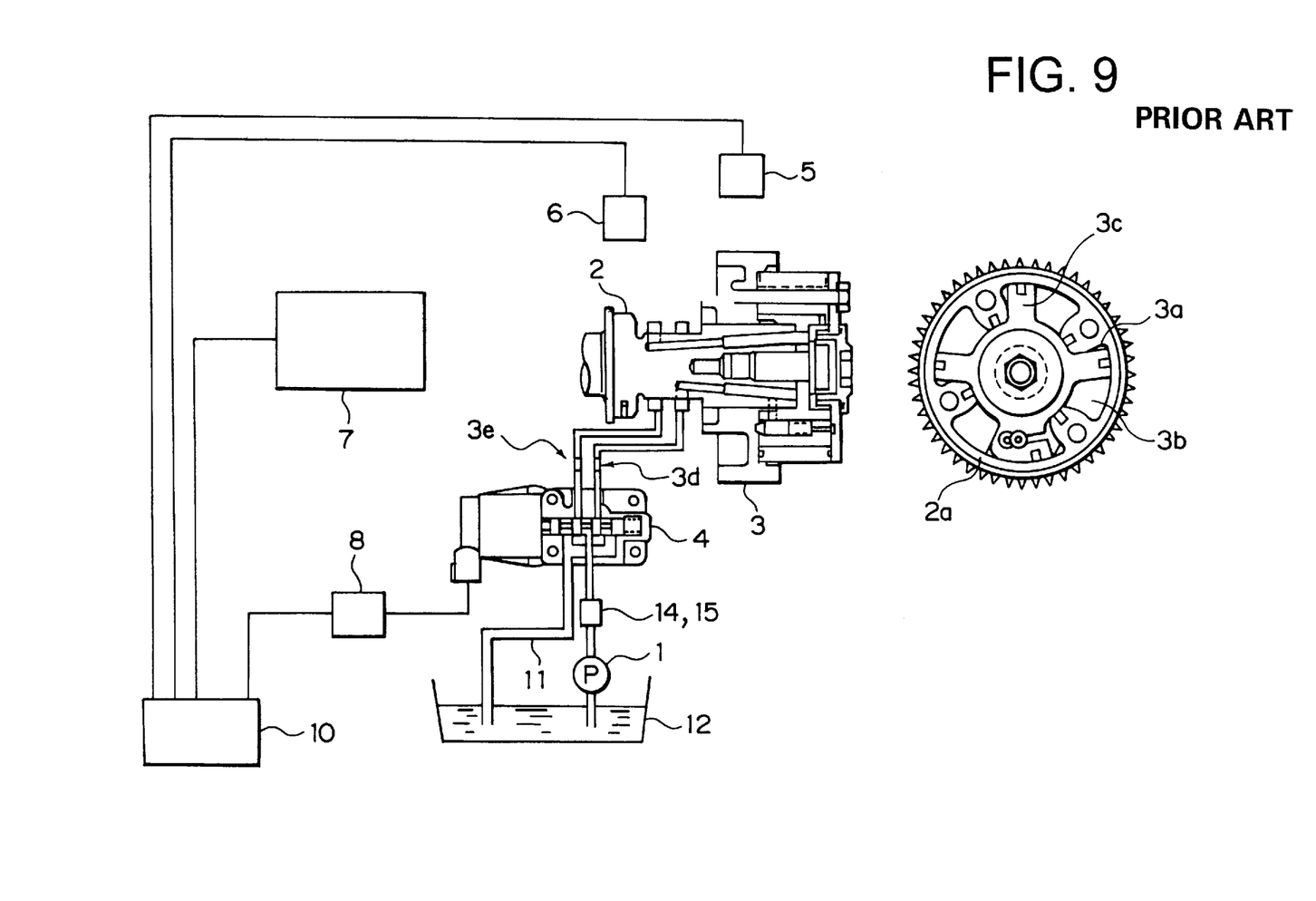
FIG. 9 is a schematic diagram showing the hardware structure of a conventional valve timing control device to which the present invention is applicable.

A conventional valve timing control device for use in an internal combustion engine includes, as shown in FIG. 9, an oil pump 1 for forcedly feeding a lubricating oil to a valve timing control system, a cam shaft 2 that is coupled to a crank shaft (not shown) of an engine by means of a power transmission mechanism such as a timing belt and is driven to rotate in synchronism with the rotation of the crank shaft to cause the intake valve and the exhaust valve to open and close through a valve operating mechanism, and a variable valve timing control hydraulic actuator 3 (hereinafter simply referred to as "VVT actuator") for varying the rotational phase of the cam shaft with respect to the crankshaft. The conventional valve timing control device also includes an oil control valve 4 for adjusting the amount of lubricating oil in the form of an operating oil supplied to the VVT actuator 3, a crank angle detector 5 for detecting the rotational phase of the crank shaft, a cam angle detector 6 for detecting the rotational phase of the cam shaft, and an engine operating state detector 7 for detecting the operating state of the internal combustion engine. The conventional valve timing control device further includes an oil control valve control circuit 8 that electrically drives the oil control valve 4, an electronic control unit (ECU) 10 that gives an instruction or command to the oil control valve control circuit 8, an oil temperature detector 14 for detecting the temperature of the lubricating oil supplied to the oil control valve 4, and a hydraulic pressure detector 15 for detecting the hydraulic pressure of the lubricating oil.

Subsequently,. the operation of the above-described conventional valve timing control device will be described. The ECU 10 calculates the current open/close timing (hereinafter simply referred to as "valve timing") of the intake and exhaust valves on the basis of an output of the engine operating state detector 7 that detects the operating state of the internal combustion engine. The ECU 10 calculates the operating amount of the oil control valve 4 in accordance with the hydraulic pressure of the lubricating oil so as to reduce a deviation between an optimum valve timing and the current valve timing, and outputs an instruction or command to the oil control valve control circuit 8. The oil control valve control circuit 8 adjusts the supply voltage or current to the oil control valve 4 so that the operating amount instructed by the ECU 10 and the electric behavior of the oil control valve 4 coincide with each other.

The lubricating oil forcedly fed from the oil pump 1 is controlled by the oil control valve 4 and then supplied to any one of a spark retarding chamber 3a and a valve timing advancing chamber 3b of the VVT actuator 3 by an appropriate amount in a desired direction. On the other hand, the lubricating oil, filled in the other chamber to which the lubricating oil is now not being supplied, is returned to an oil pan 12 through a drain 11 of the oil control valve 4.

When the oil is supplied to the spark retarding chamber 3a or to the valve timing advancing chamber 3b of the VVT actuator 3, a rotor 3c within the VVT actuator 3 is driven to rotate in a direction toward a valve timing advancing side or a spark retarding side due to hydraulic pressure. The cam shaft 2 is coaxially connected to the rotor 3c, and the rotation of the rotor 3c allows the rotational phase of the cam shaft 2 to vary with respect to the rotational phase of the crank shaft to thereby change the valve timing.

Figure 10:
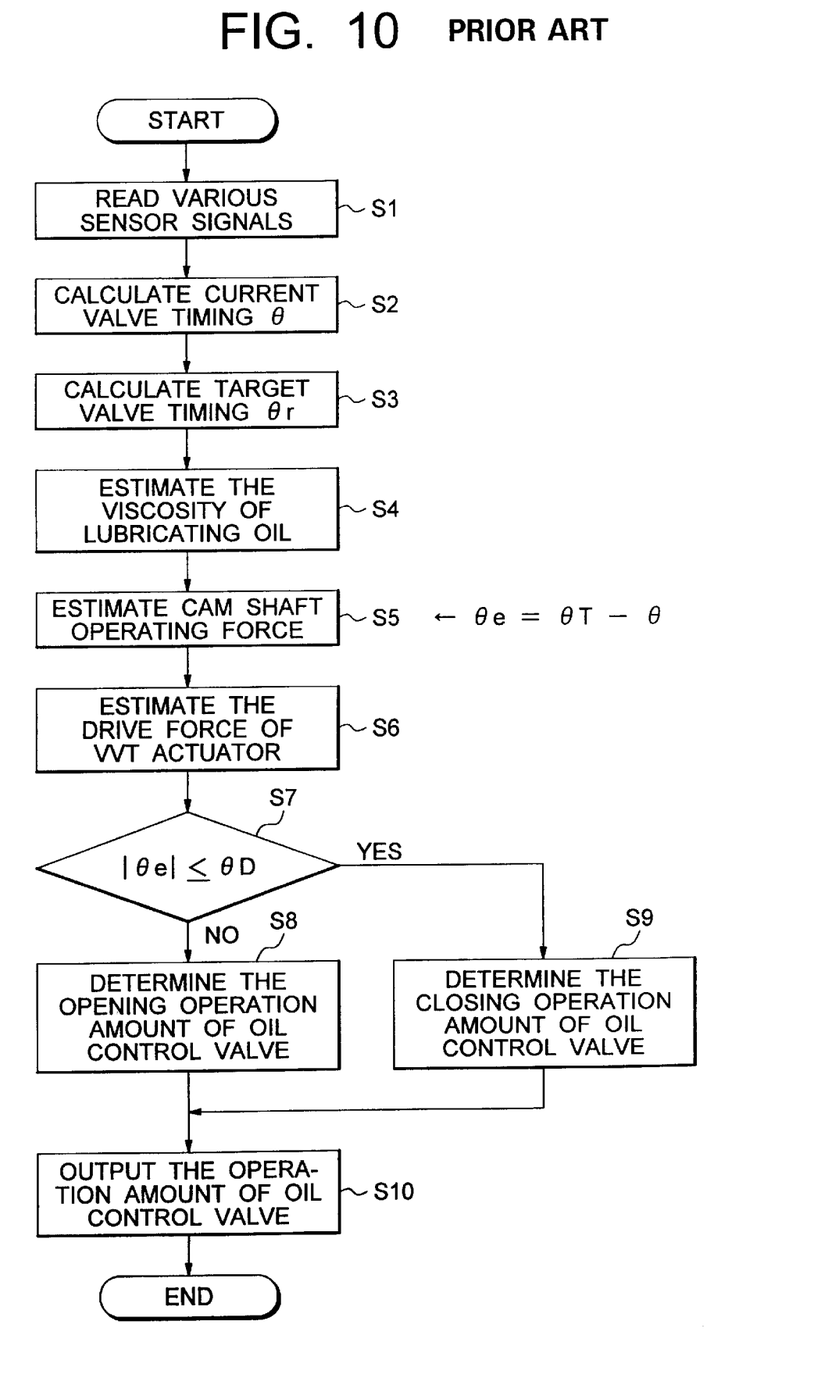
FIG. 10 is a flowchart showing the operation of the conventional valve timing control device shown in FIG. 9.

Subsequently, a control method or operation of the control device or ECU 10 that estimates the drive force of the VVT actuator 3 on the basis of the operating state of the engine and controls the valve timing in response to the drive force will be described with reference to a flowchart shown in FIG. 10.

First, the ECU 10 reads various sensor signals from the operating state detector 7, the crank angle detector 5 that detects the rotational phase of the crank angle and the cam angle detector 6 that detects the rotational phase of the cam shaft 2 (step S1), and calculates the current valve timing $\theta$ from the rotational phase of the crank angle and the rotational phase of the cam shaft 2 thus read (step S2).

Also, in step S3, an optimal valve timing $\theta T$ (hereinafter referred to as "target valve timing") in the engine operating state is calculated from the sensor signals (for example, the number of revolutions per minute (rpm) or rotational speed of the engine, the throttle opening degree, the charging efficiency, the temperature of an engine coolant or cooling water, etc.) indicative of the engine operating state as read in step S1.

In addition, the ECU 10 reads an oil temperature from the oil temperature detector for detecting the temperature of the lubricating oil (hereinafter referred to as "oil temperature") and estimates the viscosity of the lubricating oil from the oil temperature thus read in (step S4).

Subsequently, in step S5, the ECU 10 calculates a deviation $\theta e$ of the current valve timing with respect to the target valve timing and estimates a force (hereinafter referred to as "an operating force Fc of the cam shaft 2") necessary for operating the cam shaft 2 in order to set the deviation $\theta e$ to zero, from the viscosity of the lubricating oil as estimated in step S4 and the rotational speed (rpm) of the engine.

In step S6, the hydraulic pressure is read from the hydraulic pressure detector 15 that detects the supply pressure of the lubricating oil (hereinafter referred to as "hydraulic pressure") and then a cam shaft drive force Fp for driving the cam shaft 2 to rotate is determined from the hydraulic pressure supplied to the VVT actuator 3, to thereby estimate a force (hereinafter referred to as "ACT drive force Fa") by which the VVT actuator 3 changes the rotational phase of the cam shaft 2 with respect to the rotational phase of the crank shaft, where Fa=Fp−Fc.

In step S7, the operation of opening (when $|\theta e|>\theta D$) or closing (when $|\theta e| \geq \theta D$) of the oil control valve 4 is determined on the basis of the relation in magnitude between the deviation $\theta e$ and a dead zone $\theta D$. The dead zone $\theta D$ may b set to "0".

Then, In step S8, the operating amount for opening the oil control valve 4 is determined. The operating amount is determined on the basis of the deviation $\theta e$ calculated in step S5 and the ACT drive force Fa estimated in step S6. For example, if PID control is applied in the determination of the operating amount, respective gains are set in accordance with the ACT drive force Fa.

In step S9, the operating amount for closing the oil control valve 4 is determined through the same operation as in step S8.

In step S10, the operating amount determined in step S8 or S9 is converted into an electric signal by means of the oil control valve control circuit 8 to thereby drives the oil control valve 4.

Figure 3:
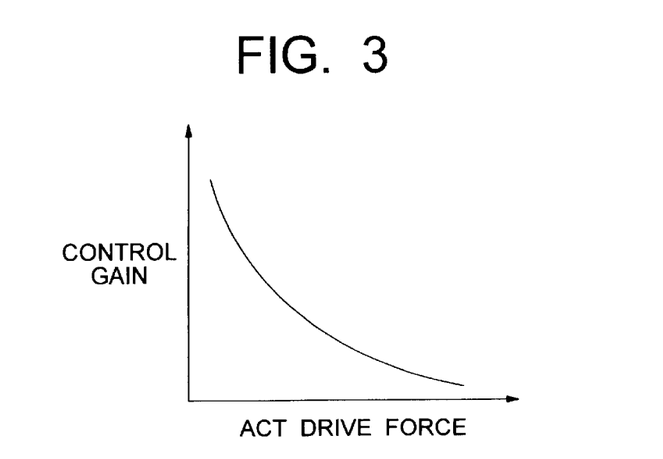
FIG. 3 is a graph showing a relation between a control gain and an ACT drive force in accordance with the present invention.

In the control device that estimates the ACT drive force Fa and controls the valve timing in response to the ACT drive force Fa as described above, the operating amount of the oil control valve 4 is determined by multiplying the deviation between the target valve timing advancing amount and the actual valve timing advancing amount by a control gain which is set in response to the estimated ACT drive force. In general, a response time of the VVT actuator 3 tends to increase as the ACT drive force decreases, so the control gain is set to be large with the decreasing ACT drive force in order to provide stabilized controllability regardless of fluctuations of the ACT drive force (see FIG. 3).

However, because the hydraulic pressure depends on the temperature of the lubricating oil and the rotational number or speed of the engine, there is a case in which the hydraulic pressure temporarily remarkably becomes low depending on the operating state of the engine, and the ACT drive force becomes in the vicinity of or not greater than zero (0). In other words, this is a case of Fp<Fc. Also, even if a sufficient ACT drive force exists immediately before the VVT operation, there is a case where the ACT drive force cannot sufficiently be ensured immediately after the VVT operation due to a reduction of the hydraulic pressure accompanied by the VVT operation. If the VVT is operated in this state, there arises such a problem in that the response of the actual valve timing advancing amount with respect to a change in the target valve timing advancing amount is remarkably lowered, or that the valve timing advancing amount cannot be held to a desired valve timing advancing amount.

Also, in the case where the valve timing cannot be set to a desired valve timing advancing amount, combustion in the internal combustion engine may become unstable or drivability and exhaust gas emission may be deteriorated.

Further, there may be a case in which abnormal abrasion occurs in the VVT actuator because the VVT actuator heavily vibrates in the vicinity of the most spark retarding position.

In addition, the VVT system having the hydraulic pressure detector 15 suffers from such a problem that it cannot detect an abnormality (for example, leakage of the lubricating oil from the VVT actuator due to wearing or the like) at the downstream of the hydraulic oil detector 15 although it can detect a hydraulic pressure abnormality at the upstream of the hydraulic pressure detector 15.

SUMMARY OF THE INVENTION

Accordingly, an object of the present invention is to provide a valve timing control device for use in an internal combustion engine which is capable of overcoming the above-described various problems with the prior art.

In order to achieve the above object, according to the present invention, there is provided a valve timing control device for use in an internal combustion engine, comprising: a valve timing controller for variably controlling the open/close timing of intake and exhaust valves of the internal combustion engine; a drive force estimator provided in the valve timing controller for estimating a drive force of a VVT actuator on the basis of a hydraulic pressure supplied thereto; and a variable control limiter for limiting control made by the valve timing controller when the drive force of the VVT actuator, which is estimated by the drive force estimator, is equal to or less than a variable valve timing control limit boundary value.

In a preferred form of the invention, the variable control limiter has, as the variable valve timing limit boundary value, the drive force of the VVT actuator that satisfies a given response time under the variable valve timing control.

In another preferred form of the invention, the variable control limiter learns the variable valve timing control limit boundary value as an initial value.

In a further preferred form of the invention, the variable control limiter updates the valve timing variable control boundary value on the basis of a behavior of the actual valve timing advancing amount responsive to a valve timing advancing command for variable valve timing control.

In a still further preferred form of the invention, the variable control limiter determines an update amount of the variable valve timing control limit boundary value in accordance with a change in the actual valve timing advancing amount with respect to time.

In a yet further preferred form of the invention, the valve timing control device further comprises an abnormality determiner for judging an abnormality of the VVT system when the variable valve timing control limit boundary value exceeds a given value.

BRIEF DESCRIPTION OF THE DRAWINGS

Other objects and advantages of the present invention will become apparent to those skilled in the art as the description proceeds when taken in conjunction with the accompanying drawings, in which:

FIG. 6 is a graph showing a relation between an update amount ΔFL of a VVT control limit boundary value FL and an actual valve timing advancing amount θa;

DESCRIPTION OF THE PREFERRED EMBODIMENTS

Now, a description will be given in more detail of preferred embodiments of the present invention with reference to the accompanying drawings.

FIRST EMBODIMENT

Figure 1:
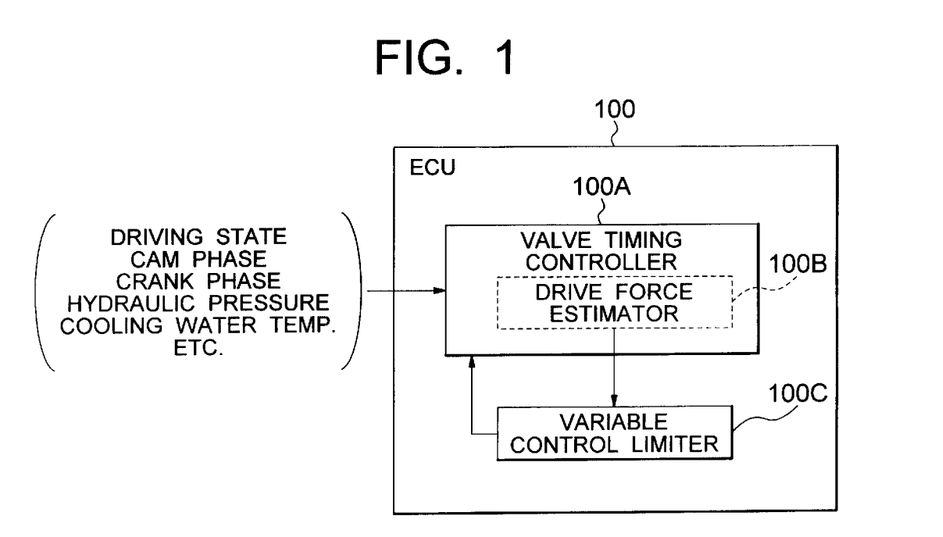
FIG. 1 is a block diagram showing the functional construction of an essential portion (ECU) of a valve timing control device in accordance with a first embodiment of the present invention.
Figure 2:
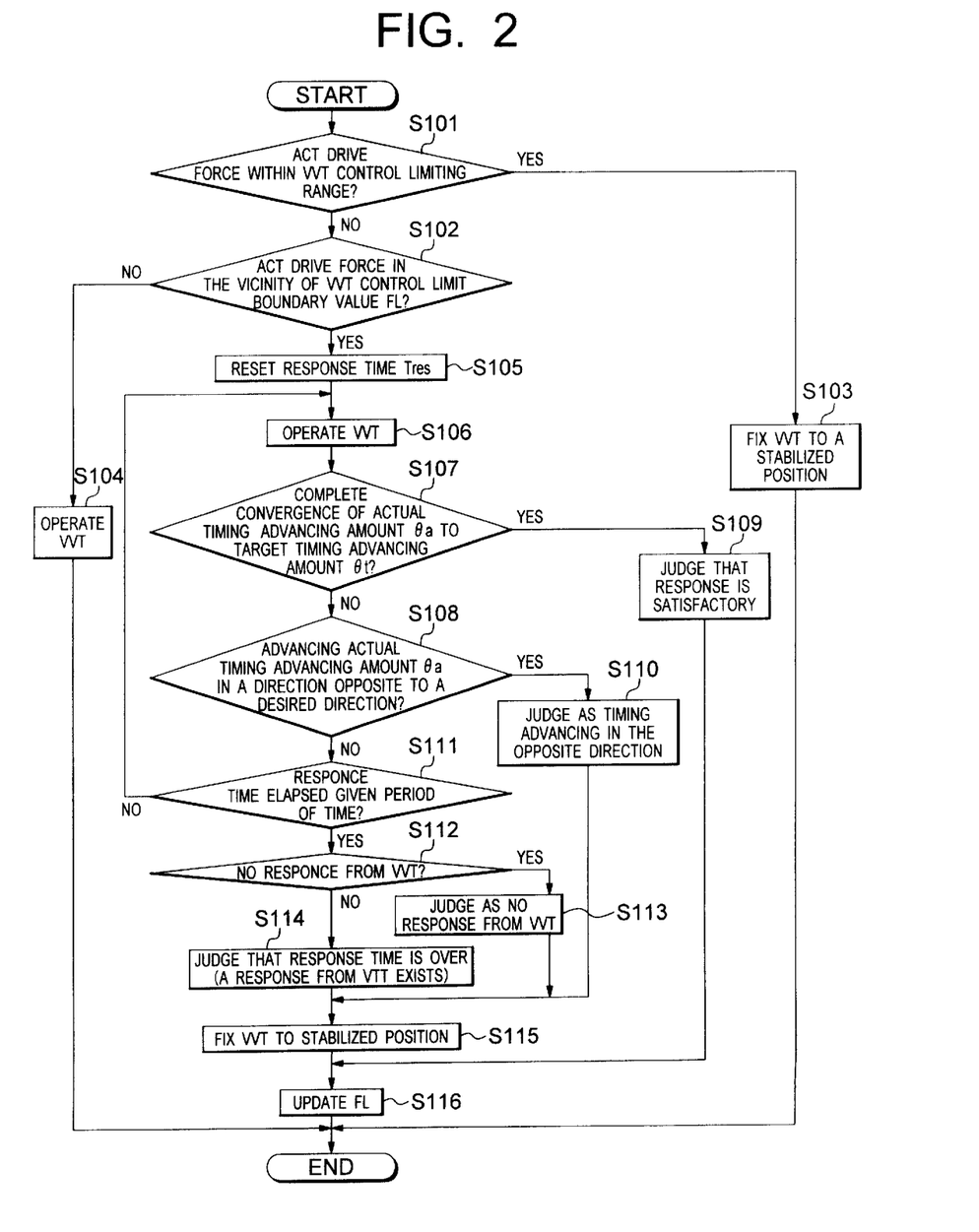
FIG. 2 is a flowchart showing the operation of the valve timing control device in accordance with the first embodiment of the present invention.

FIG. 1 is a block diagram showing the functional construction of an electronic control unit (ECU) 100 in accordance with a first embodiment of the present invention. FIG. 2 is a flowchart showing the control operation of the ECU 100 in accordance with the first embodiment. The hardware configuration of a valve timing control device for use in an internal combustion engine in accordance with the present invention is identical with the hardware configuration of the conventional example as already described and shown in FIG. 9, but the functional construction and operation of the electronic control unit (ECU) 100 are different from those of the conventional example.

Referring to FIG. 1, the ECU 100 includes a valve timing controller 100A which detects the operating state of the internal combustion engine and calculates an optimum valve timing in that operating state to variably control the open/close timing of intake and exhaust valves, a drive force estimator 100B which is disposed in the valve timing controller 100A and estimates the drive force of a VVT actuator on the basis of a hydraulic pressure of an operating oil supplied thereto, and a variable control limiter 100C which limits control made by the valve timing controller 100A when the drive force of the VVT actuator estimated by the drive force estimator 100B is equal to or less than a variable valve timing control limit boundary value.

Figure 4:
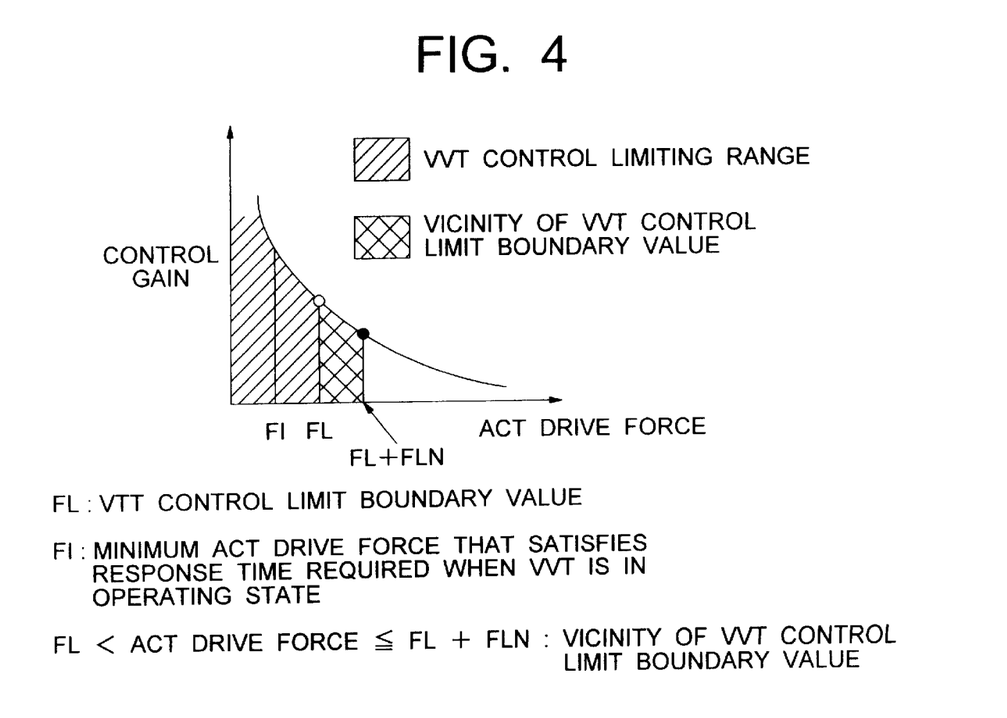
FIG. 4 is a graph showing a VVT control limiting range and the vicinity of a VVT control limit boundary value.

As shown in FIG. 4 which will be described later, the variable control limiter 100C has the drive force of the VVT actuator (hereinafter referred to as "ACT drive force") which satisfies a given response time as the variable valve timing limit boundary value (hereinafter referred to as "VVT control limit boundary value") FL under the variable valve timing control, and learns the VVT control limit boundary value FL during the operation of the engine. The VVT control limit boundary value FL is updated on the basis of the behavior of the actual valve timing advancing amount (actual valve timing advancing amount) $\theta a$ responsive to the valve timing advancing instruction for the variable valve timing control, and its update amount is determined in accordance with a change in the actual valve timing advancing amount $\theta a$ with respect to time.

It is assumed that the VVT control limit boundary value FL is predetermined as an initial value as shown in FIG. 4. In other words, F1 is set to the minimum value of the ACT drive force which satisfies a response time required when the VVT system is in the operating state, and FL is set to the ACT drive force produced when the VVT system is inoperable in this operating state. Also, the VVT actuator can be fixed at a given position by a stopper pin or the like when no hydraulic pressure is applied thereto, and the stopper pin is constructed such that it is released when the hydraulic pressure is applied thereto.

Subsequently, the control operation of the ECU 100 will be described with reference to the flowchart shown in FIG. 2. First, if the ACT drive force estimated in the same manner as that in step S6 of FIG. 10 is within a VVT control limiting range in step S101, the VVT cannot be controlled to a desired valve timing advancing amount when the VVT is operated within that range. Therefore, the VVT is fixed to the most stabilized position without any hydraulic pressure, for example, the most spark retarding position in case of the intake valve (step S103). If the estimated ACT drive force is out of the control limiting range, processing is then advanced to step S102.

If the ACT drive force is not in the vicinity of the VVT control limit boundary value FL {FL<ACT drive force≦FL +FLN, where FLN is an arbitrary given amount (refer to FIG. 4)} in step S102, processing is advanced to step S104 and the VVT is operated without updating the VVT control limit boundary value. If the ACT drive force is in the vicinity of the VVT control limit boundary value FL in step S102, processing is advanced to step S105 where the response time Tres is reset (Tres=0). Then, processing is advanced to step S106.

In step S106, the VVT is operated (during this operation, Tres is added or accumulated).

Subsequently, it is judged in step S107 whether or not the actual valve timing advancing amount $\theta a$ is converged to the target valve timing advancing amount $\theta T$. Specifically, it is judged whether or not $|\theta a - \theta T| < \epsilon$ ($\epsilon$ is an arbitrary value indicative of a convergent judgement error) is satisfied. If this condition is satisfied, it is found that the actual valve timing advancing amount $\theta a$ is converged to the target valve timing advancing amount $\theta T$ at a speed higher than a given time Tpre judged in step S111 which will be described later. Therefore, it is judged that the response is satisfactory, and processing is branched to step S109. On the other hand, if the above condition is not satisfied in step S107 (that is, $|\theta a - \theta T| > \epsilon$), processing is advanced to step S108.

It is judged in step S108 whether the actual valve timing advancing amount $\theta a$ always changes toward the target valve timing advancing amount. Specifically, it is judged whether differential of the target valve timing advancing amount by time always satisfies $d\theta a/dt \geq 0$. If $d\theta a/dt < 0$ is judged, the target valve timing advancing amount is changed in a direction to enlarge the deviation in consideration of the condition in step S107, although the actual valve timing advancing amount $\theta a$ has a sufficient deviation with respect to the target valve timing advancing amount $\theta T$. Therefore, it is judged that the actual valve timing advancing amount $\theta a$ is advanced in a direction opposite to a desired direction. Processing is then branched to step S110.

If $d\theta a/dt \geq 0$ is satisfied in step S108, processing is advanced to step S111.

Figure 5:
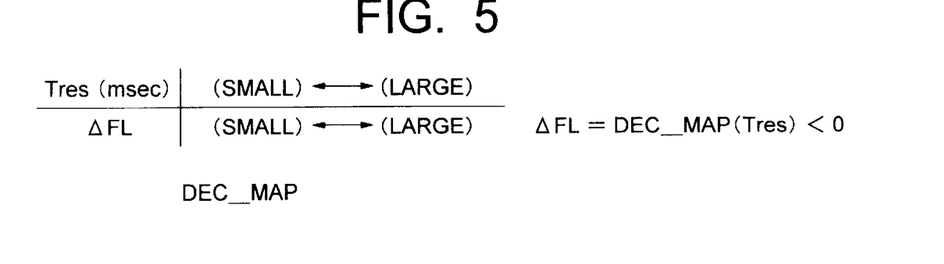
FIG. 5 is a graph showing a relation between an update amount ΔFL of a VVT control limit boundary value FL and a response time Tres.

In step S109, the update amount $\Delta FL$ of the VVT control limit boundary value FL is obtained by DEC_MAP in FIG. 5 showing their relation ($\Delta FL = DEC\_MAP(Tres)$). Specifically, because it can be judged that the response is more satisfactory as the response time is shorter, DEC_MAP is set such that the update amount $\Delta FL$ (a negative value in this example) becomes larger (the absolute value becomes smaller) with an increase in the value of the response time Tres. The update amount $\Delta FL$ corresponding to the response time Tres of DEC_MAP is determined through an experiment or the like in advance.

In step S110, the given value FR obtained in the case where the VVT is advanced in an opposite direction within the given period of time Tpre is set to the update amount $\Delta FL$ of the VVT control limit boundary value FL. That is, $\Delta FL = FR$ is set.

In step S111, it is judged whether the response time Tres after the VVT starts to operate elapses the given period of time Tpre. In this example, it is desirable that the given period of time Tpre is set to not greater than a response time required by the VVT system. If the response time Tres does not exceed the given period of time Tpre, processing is returned to step S106. If the response time Tres exceeds the given period of time Tpre, it is judged that the response time Tres at the ACT drive force cannot satisfy a required value, and processing is advanced to step S112.

In step S112, it is judged whether the VVT does not at all respond to the ACT drive force for which the response time Tres exceeds the given period of time Tpre or slowly responds thereto during the given period of time Tpre.

Specifically, it is judged whether the actual valve timing advancing amount θa is equal to or less than a given threshold value θNR (θNR is an arbitrary value for judging no response and desirably set to a value close to 0), that is, whether θa ≦θNR is satisfied. If this condition is satisfied, it is judged that the VVT did not respond within the given period of time Tpre at all, and processing is branched to step S113. If this condition is not satisfied, it is judged that the response is very slow, and processing is branched to step S114.

In step S113, a given value FNR obtained in the case where the VVT does not respond within the given period of time Tpre is set as the update amount ΔFL of the VVT control limit boundary value FL. That is, ΔFL=FNR is set.

Figure 6:
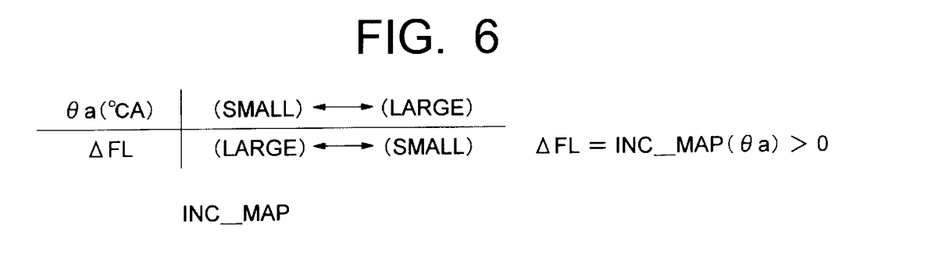

In step S114, the update amount ΔFL of the VVT control limit boundary value FL is obtained from INC_MA shown in FIG. 6. Specifically, because it can be judged that the response is lowered more as the amount of movement (actual valve timing advancing amount) θa within the given period of time Tpre is smaller, INC_MAP is set such that the update amount ΔFL (a positive value in this example) becomes smaller with an increase in the value of the amount of movement (actual valve timing advancing amount) θa. The update amount ΔFL with respect to the amount of movement (actual valve timing advancing amount) of INC_MAP is determined through an experiment or the like in advance.

In step S115, the VVT is fixed to a position stabilized even without any hydraulic pressure. That is, the processing results immediately before step S115 are any one of the following cases.

1) The VVT does not respond at all within the given period of time Tpre (step S113);
2) The VVT may be advanced in a direction opposite to the desired direction (step S110); and
3) The VVT cannot satisfy the required response time (it is advanced to some degree in the given period of time Tpre) (step S114).

Therefore, it is judged that VVT cannot be stabilized in the ACT drive force in that operating state, and the VVT is fixed to a position stabilized even without any hydraulic pressure.

In step S116, the VVT control limit boundary value is updated by use of the update amount ΔFL. Specifically, it is updated by the following expression.

FL=FL+ΔFL

The level of deterioration of the response is relieved in the stated order of the above items 1) (The VVT does not respond at all within the given period of time Tpre), 2) (The VVT may be advanced in a direction opposite to the desired direction), and 3) (The VVT cannot satisfy the required response time but is advanced to some degree in the given period of time Tpre). The values of ΔFL set in step S110, step S113 and step S114, respectively, are preferably set as follows:

INC_MAP (θa)≦FR≦FNR where INC_MAP (θa) is a map value corresponding to the valve timing advancing amount θa obtained by INC_MAP shown in FIG. 6.

As described above, according to the first embodiment, even when the ACT drive force is remarkably lowered, that is, even when the ACT drive force becomes equal to or less than the VVT control limit boundary value, the VVT actuator is fixed to the most stabilized position by limiting control made by the valve timing controller 100A, thereby making it possible to prevent the deterioration of drivability and the exhaust gas emission, and also making it possible to prevent abnormal wearing of the VVT actuator due to vibration.

Also, since the ACT drive force that satisfies the given response time is set as the VVT control limit boundary value under the variable valve timing control, the VVT is not operated so that the stabilized controllability is obtained even if the ACT drive force is decreased due to a lowered hydraulic pressure after the operation of the VVT, in a state where the ACT drive force does not reach the VVT control limit boundary value after the operation of the VVT.

Further, since the VVT control limit boundary value is learned as an initial value by the variable control limiter 100C, the stabilized controllability is obtained without any influence of a variation in manufacture of system components and a change over time such as wearing.

Still further, since the VVT control limit boundary value is updated on the basis of the behavior of the actual valve timing advancing amount responsive to the valve timing advancing command for the variable valve timing control, the stability of the operation of the actual VVT system can be reflected to the stabilizing control of the VVT system. Consequently, the operation of the VVT system can be stabilized.

Moreover, since the update amount of the VVT control limit boundary value is determined by a change of the actual valve timing advancing amount with respect to time, the period of time until the current boundary value is converged to a real boundary value can be shortened.

SECOND EMBODIMENT

Figure 7:
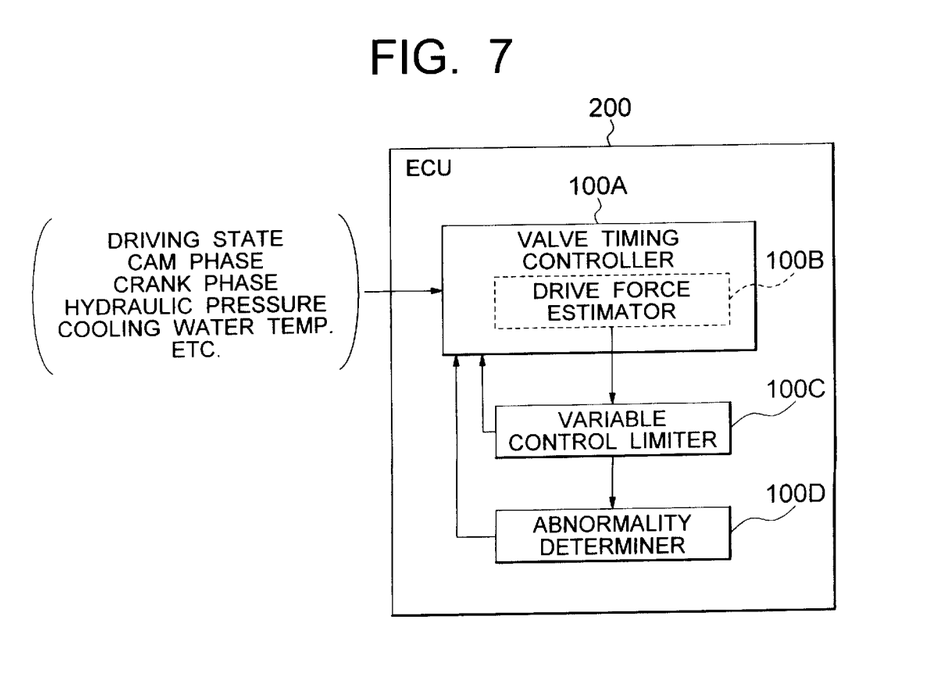
FIG. 7 is a block diagram showing the functional construction of an essential portion (ECU) of a valve timing control device in accordance with a second embodiment of the present invention.
Figure 8:
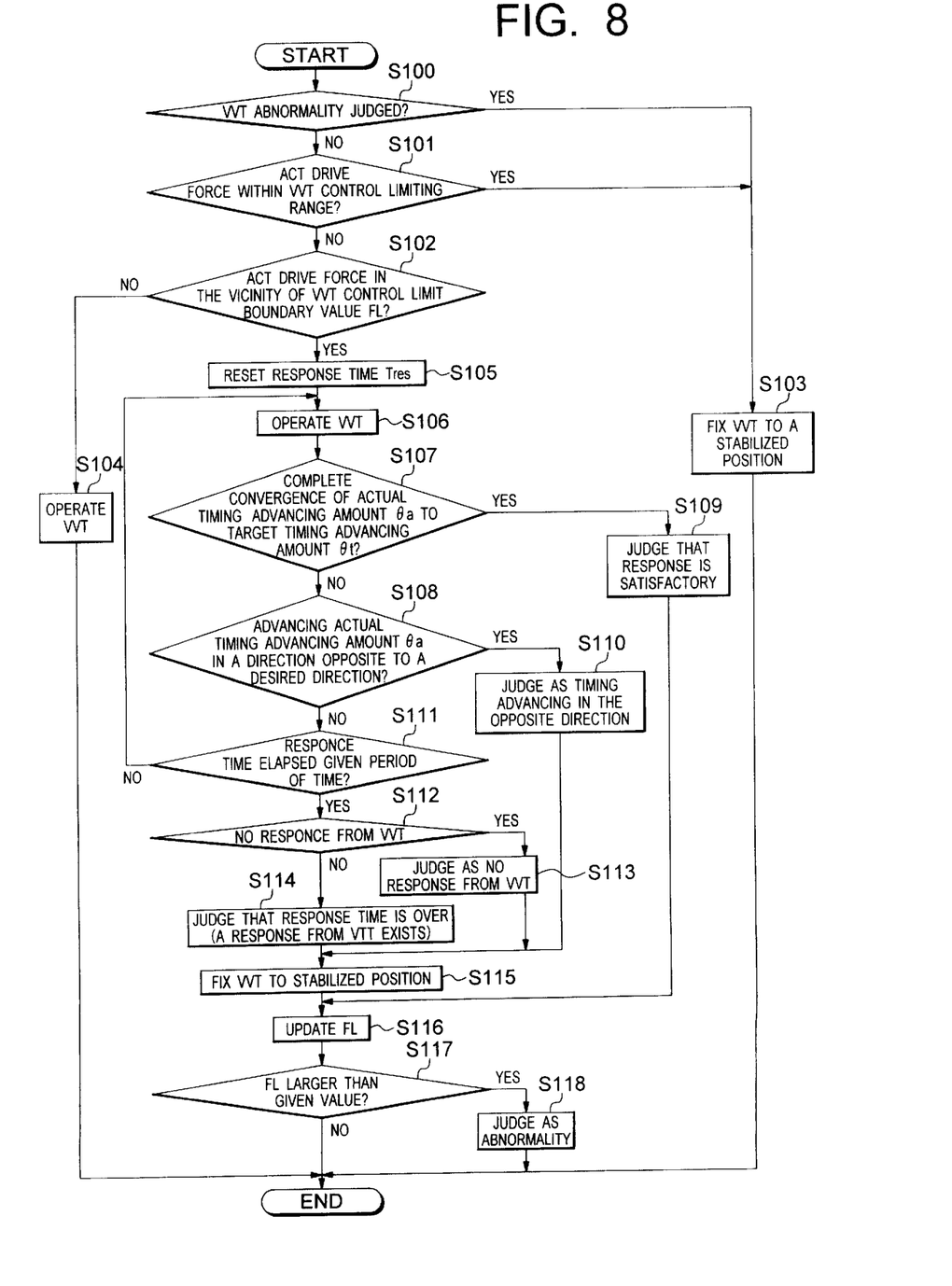
FIG. 8 is a flowchart showing the operation of the valve timing control device in accordance with the second embodiment of the present invention.

FIG. 7 is a block diagram showing the functional construction of an electronic control unit (ECU) 200 in accordance with a second embodiment of the present invention. FIG. 8 is a flowchart showing the control operation of the ECU 200 in accordance with the second embodiment. The hardware configuration in accordance with the second embodiment is identical with the hardware configuration of the above-described conventional example shown in FIG. 9, and only the functional structure and operation of the electronic control unit (ECU) 200 are different from those of the conventional example.

As shown in FIG. 7, the ECU 200 according to the second embodiment includes abnormality determiner 100D for judging an abnormality of the valve timing control device 100A when the VVT control limit boundary value becomes larger than a given value, in addition to the construction of the ECU 100 of the above-mentioned first embodiment.

Subsequently, the control operation of the ECU 200 in accordance with the second embodiment will be described with reference to the flowchart shown in FIG. 8.

First, in step S100, it is judged whether the abnormality judgement of the VVT system has already been conducted. If the abnormality judgement has been conducted, the VVT system is fixed to a stabilized position to complete processing in step S103. If the abnormality judgement has not been conducted, processing is advanced to step S101.

Processing of from step S101 to step S116 is identical with that in the above-mentioned first embodiment, and therefore its description will be omitted.

In step S117, it is judged whether the VVT control limit boundary value FL exceeds a given value FLpre. If FL<FLpre, the abnormality of the VVT system is judged, and processing is advanced to step S118. If not, it is judged that the VVT system is not abnormal, and processing is completed. That is, when the actual ACT drive force is lowered, the VVT control limit boundary value FL goes up.

Therefore, when the VVT control limit boundary value FL exceeds the given value FLpre (FL<FLpre), it can be judged that the actual ACT drive force is abnormally lowered.

In step S118, it is judged that the stabilized control cannot be executed because of the abnormality of the VVT system, and the VVT is fixed to a position stabilized even without any hydraulic pressure, thereby completing processing.

The second embodiment provides the following advantages in addition to the advantages obtained by the above first embodiment. That is, since the VVT system is judged as abnormal when the VVT control limit boundary value becomes larger than the given value, the abnormality at the VVT system downstream of the hydraulic pressure detector which cannot be detected by the hydraulic detector 15 can be detected.

As described above, a valve timing control device for use in an internal combustion engine according to the present invention includes: a valve timing controller for variably controlling the open/close timing of intake and exhaust valves of the internal combustion engine; a drive force estimator provided in the valve timing controller for estimating a drive force of a VVT actuator on the basis of a hydraulic pressure supplied thereto; and a variable control limiter for limiting control made by the valve timing controller when the drive force of the VVT actuator, which is estimated by the drive force estimator, is equal to or less than a variable valve timing control limit boundary value. With the above construction, even when the ACT drive force is remarkably lowered (i.e., the ACT drive force becomes equal to or less than the variable valve timing control limit boundary value), the VVT actuator can be fixed to the most stabilized position by limiting control made by the valve timing controller through the variable control limiter, thereby making it possible to stabilize the operating state of the internal combustion engine. Therefore, the deterioration in drivability and exhaust gas emission can be prevented, and also abnormal wearing of the VVT actuator due to vibration can be prevented.

Also, the variable control limiter has, as the variable valve timing limit boundary value, a drive force of the VVT actuator that satisfies a given response time under the variable valve timing control. With the this construction, the VVT is not operated so that the stabilized controllability is obtained even if the drive force of the VVT actuator is decreased due to a lowered hydraulic pressure after the operation of the VVT, in a state where the drive force of the VVT actuator does not reach the VVT control limit boundary value after the operation of the VVT.

Further, since the variable control limiter learns the variable valve timing control limit boundary value as an initial value, the stabilized controllability is obtained without any influence of a variation in manufacture of system components and a change over time such as wearing.

Still further, since the variable control limiter updates the variable valve timing control boundary value on the basis of a behavior of the actual valve timing advancing amount responsive to a valve timing advancing command for variable valve timing control, the stability of the operation of the actual VVT system can be reflected on the stabilizing control of the VVT system. Consequently, the operation of the VVT system can be stabilized.

Moreover, since the variable control limiter determines the update amount of the variable valve timing control limit boundary value in accordance with a change in the actual valve timing advancing amount with respect to time, the period of time until the current boundary value is converged to a real boundary value can be shortened.

In addition, since the valve timing control device further includes an abnormality determiner for judging an abnormality of the VVT system when the variable valve timing control limit boundary value exceeds a given value, an abnormality in the VVT system downstream of the hydraulic pressure detector, which cannot be detected by the hydraulic detector, can be detected.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A valve timing control device for use in an internal combustion engine, comprising:
    a valve timing controller for variably controlling the open/close timing of intake and exhaust valves of the internal combustion engine;
    a drive force estimator provided in said valve timing controller for estimating a drive force of a variable valve timing (VVT) actuator on the basis of a hydraulic pressure supplied thereto; and
    a variable control limiter for limiting control made by said valve timing controller when the drive force of the VVT actuator, which is estimated by said drive force estimator, is equal to or less than a variable valve timing control limit boundary value.

2. The valve timing control device for use in an internal combustion engine according to claim 1, wherein said variable control limiter has, as the variable valve timing limit boundary value, the drive force of the VVT actuator that satisfies a given response time under the variable valve timing control.

3. The valve timing control device for use in an internal combustion engine according to claim 2, wherein said variable control limiter learns said variable valve timing control limit boundary value as an initial value.

4. The valve timing control device for use in an internal combustion engine according to claim 3, wherein said variable control limiter updates said valve timing variable control boundary value on the basis of a behavior of the actual valve timing advancing amount responsive to a valve timing advancing command for variable valve timing control.

5. The valve timing control device for use in an internal combustion engine according to claim 4, wherein said variable control limiter determines an update amount of said variable valve timing control limit boundary value in accordance with a change in the actual valve timing advancing amount with respect to time.

6. The valve timing control device for use in an internal combustion engine according to claim 3, further comprising an abnormality determiner for judging an abnormality of the VVT system when said variable valve timing control limit boundary value exceeds a given value.

* * * * *